United States Patent
Homann

(10) Patent No.: US 11,038,220 B2
(45) Date of Patent: Jun. 15, 2021

(54) BATTERY MODULE AND METHOD FOR PRODUCING A BATTERY MODULE AND BATTERY

(71) Applicant: Robert Bosch GmbH, Stuttgart (DE)

(72) Inventor: Jerome Homann, Renningen (DE)

(73) Assignee: Robert Bosch GmbH, Stuttgart (DE)

(*) Notice: Subject to any disclaimer, the term of this patent is extended or adjusted under 35 U.S.C. 154(b) by 270 days.

(21) Appl. No.: 15/949,522

(22) Filed: Apr. 10, 2018

(65) Prior Publication Data
US 2018/0351220 A1    Dec. 6, 2018

(30) Foreign Application Priority Data

Apr. 11, 2017 (DE) .................. 10 2017 206 165.0

(51) Int. Cl.
| | |
|---|---|
| *H01M 10/613* | (2014.01) |
| *H01M 10/653* | (2014.01) |
| *H01M 10/6554* | (2014.01) |
| *H01M 50/172* | (2021.01) |

(52) U.S. Cl.
CPC ....... *H01M 10/613* (2015.04); *H01M 10/653* (2015.04); *H01M 10/6554* (2015.04); *H01M 50/172* (2021.01)

(58) Field of Classification Search
CPC ........... H01M 10/613; H01M 10/6554; H01M 10/653; H01M 10/65; H01M 10/652; H01M 10/6551; H01M 10/658; H01M 2/06; H01M 6/5038; H01M 50/172
See application file for complete search history.

(56) References Cited

U.S. PATENT DOCUMENTS

| | | | | |
|---|---|---|---|---|
| 2011/0159340 A1* | 6/2011 | Hu | ...................... | H01M 2/1077 429/120 |
| 2015/0180099 A1* | 6/2015 | Hino | .................. | H01M 10/6551 429/120 |
| 2015/0334871 A1* | 11/2015 | Hill | .......................... | B32B 9/045 165/185 |
| 2016/0072164 A1* | 3/2016 | Jung | ................... | H01M 10/613 429/120 |
| 2018/0191042 A1* | 7/2018 | Chu | ........................ | C09K 5/14 |
| 2018/0301771 A1* | 10/2018 | Jennrich | ............ | H01M 2/1016 |

FOREIGN PATENT DOCUMENTS

DE        102013207535 A1    10/2014

* cited by examiner

*Primary Examiner* — Stephen J Yanchuk
(74) *Attorney, Agent, or Firm* — Michael Best & Friedrich LLP

(57) ABSTRACT

A battery module with a cooling plate and at least one battery cell, wherein the battery module further comprises a connecting system which has a first connecting element with a first surface and a further first surface and which has a second connecting element with a second surface and a further second surface, wherein the first surface of the first connecting element is connected to the at least one battery cell, and the second surface of the second connecting element is connected to the cooling plate, and the further first surface is connected to the further second surface, wherein the connection between the further first surface and the further second surface is configured with a lower adhesive force than the connection between the first surface and the at least one battery cell and/or than the connection between the second surface and the cooling plate.

14 Claims, 1 Drawing Sheet

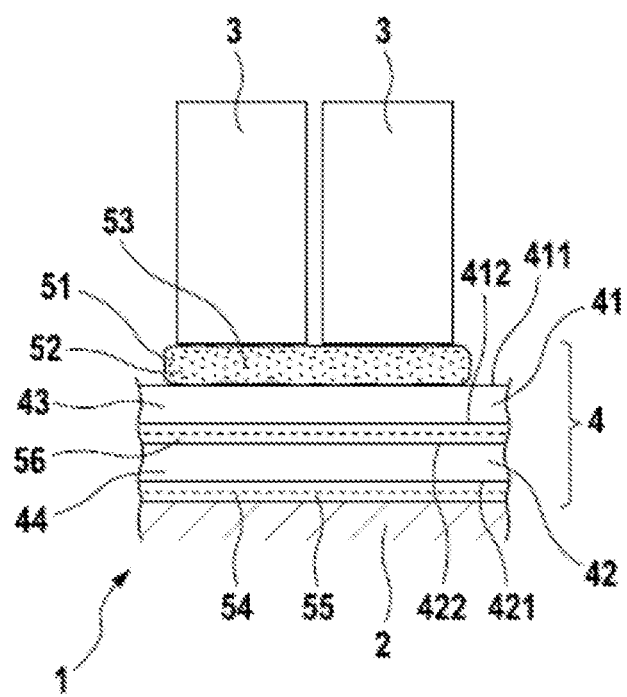

BATTERY MODULE AND METHOD FOR PRODUCING A BATTERY MODULE AND BATTERY

BACKGROUND OF THE INVENTION

The invention is based on a battery module with a cooling plate and at least one battery cell, wherein the battery module further comprises a connecting system which has a first connecting element with a first surface and a further first surface and which has a second connecting element with a second surface and a further second surface, wherein the first surface of the first connecting element is connected to the at least one battery cell, and the second surface of the second connecting element is connected to the cooling plate, and the further first surface is connected to the further second surface. Furthermore, the invention also relates to a method for producing a battery module. The subject matter of the present invention is also a battery.

It is known from the prior art that batteries, in particular batteries of electric and hybrid vehicles, such as also in particular lithium-ion batteries, consist at least of one battery module or advantageously also of a plurality of battery modules. Furthermore, a battery module preferably has a multiplicity of individual battery cells which are connected to one another to form the battery module, wherein the individual battery cells can be interconnected serially and/or in parallel by means of cell connectors.

The battery cells here can be configured, for example, to be prismatic, and the electrochemical components of the battery cells can be accommodated here in a metallic housing. During the operation of a battery module and in particular also during the charging or rapid charging of the battery cells, the individual battery cells should be cooled. In order to efficiently remove heat here, the heat transfer between the cooling plate and the battery cells is increased by the use of what are referred to as thermal interface materials (TIM) which serve to compensate for unevennesses in the battery cells and at the same time can also provide electrical insulation.

SUMMARY OF THE INVENTION

The battery module with a cooling plate and at least one battery cell with the features of the invention have the advantage that a reliable temperature control of the at least one battery cell of the battery module and at the same time also simple separation between the at least one battery cell and the cooling plate, for example in the event of maintenance, are made possible.

For this purpose, according to the invention, a battery module with a cooling plate and at least one battery cell is provided.

The battery module here furthermore comprises a connecting system.

The connecting system has a first connecting element with a first surface and a further first surface.

The connecting system has a second connecting element with a second surface and a further second surface.

The first surface of the first connecting element is connected here to the at least one battery cell.

The second surface of the second connecting element is connected here to the cooling plate.

Furthermore, the further first surface is connected here to the further second surface.

The connection between the further first surface and the further second surface is configured here with a lower adhesive force than the connection between the first surface and the at least one battery cell and/or than the connection between the second surface and the cooling plate.

The measures cited in the dependent claims permit advantageous developments and improvements of the devices.

At this juncture, an adhesive force is intended to be understood as meaning that force which counteracts a separation of the connection of two surfaces. That is to say, for separating the connection of two surfaces, the respective adhesive force should therefore be overcome.

A battery module according to the invention has the advantage over the solutions which are known from the prior art and use thermal interface materials that it is possible to dispense with a high contact pressure for a homogeneous compression which is intended to compensate as far as possible for all of the macroscopic surface roughnesses or surface unevennesses by means of elastic or plastic deformations of the thermal interface material. As a result, it is possible to reduce the structural outlay.

Furthermore, a battery module according to the invention has the advantage over the solutions which are known from the prior art and use thermal interface materials that the heat transfer between the at least one battery cell and the cooling plate can be significantly increased since the thermal interface material thickness required for compensating for all of the unevennesses between the individual battery cells on a module plane significantly reduces the heat transfer, and therefore the heat transfer can be increased in the case of the battery module according to the invention.

In addition, the battery module according to the invention affords the advantage over solutions from the prior art, in which the individual battery cells are connected to the cooling plate by means of an adhesive, that the at least one battery cell and the cooling plate can be separated again without destruction of the cooling plate or damage of the battery module or of the battery cells.

It is of advantage here if an adhesive is arranged between the first surface of the connecting element and the at least one battery cell. A simple connection between the first surface of the connecting element and the at least one battery cell can thereby be formed in a reliable manner.

It is also of advantage here if a compensating element which is configured in an elastically and/or plastically deformable manner is arranged between the first surface of the connecting element and the at least one battery cell.

Since the connection between the further first surface and the further second surface is configured with a lower adhesive force than the connection between the first surface and the at least one battery cell, it is not absolutely necessary for the connection between the first surface and the at least one battery cell to be configured to be releasable again, and therefore unevennesses, for example of the at least one battery cell, can be reliably compensated for by means of the adhesive or the compensating element.

Overall, it is therefore possible to increase the heat transfer between the first surface of the connecting element and the at least one battery cell.

According to an advantageous aspect of the invention, the adhesive or the compensating element comprises additives which are configured for increasing the heat conductivity.

For example, the additives can be configured as metal particles. In particular, the adhesive can be configured as an epoxy adhesive comprising aluminum and/or silver particles and which has, for example, a heat conductivity of over 5 watts per meter and Kelvin.

It is expedient if the first connecting element is configured as a first film and if the second connecting element is configured as a second film.

In particular, the first film and the second film are each configured here as a plastics film, as a result of which said films can also provide electrical insulation between the at least one battery cell and the cooling plate.

For example, the first film and the second film are each configured here as a polyvinyl chloride film.

Of course, other material combinations are also possible, in which adhesives with low adhesion can also be arranged.

This has the advantage that the adhesive action between two polyvinyl chloride films can be used for connecting the first connecting element and the second connecting element, in particular without using an additional adhesive.

A first connecting element configured as a first film and a second connecting element configured as a second film afford the advantage that the connecting elements can be configured comparably with a low layer thickness and therefore do not negatively influence the heat transmission between the at least one battery cell and the cooling plate.

It is expedient if the second connecting element furthermore comprises an adhesive layer on the second surface. In particular, the second surface can be configured here to be self-adhesive. The second film is configured here in particular as a polyester film or polyvinyl chloride film with a layer of acrylate adhesive.

In an advantageous manner a further adhesive layer is arranged between the further first surface and the further second surface.

The further adhesive layer here in particular has a rubber adhesive. Such a configuration has the advantage that a sufficient adhesive force can be provided during the operation of a battery module and at the same time also simple separation of the connection is possible. As a result, the further first surface and the further second surface are reliably connected to each other.

According to an advantageous aspect of the invention, the first connecting element furthermore comprises a first adhesive layer on the further first surface. In particular, the further first surface can also be configured to be self-adhesive.

According to an advantageous aspect of the invention, the second connecting element furthermore comprises a second adhesive layer on a further second surface. In particular, the further second surface can also be configured to be self-adhesive.

As a result, a simple construction of the connecting element, in particular of the connection between the further first surface and the further second surface is possible.

Furthermore, the invention also relates to a method for producing a battery module.

In a first method step here, a cooling plate, at least one battery cell and a connecting system are provided.

The connecting system here is configured in such a manner that the connecting system comprise a first connecting element having a further first surface and a second connecting element having a further second surface.

The further first surface and the further second surface are configured here in a manner connected to each other.

In a second method step here, a second surface of the second connecting element is connected to the cooling plate.

In a third method step here, a first surface of the first connecting element is connected to the at least one battery cell.

The battery module is configured here in such a manner that the connection between the further first surface and the further second surface is configured with a lower adhesive force than the connection between the first surface and the at least one battery cell and/or than the connection between the second surface and the cooling plate.

This makes it possible to provide a battery module in which a reliable heat transfer is provided between the at least one battery cell and the cooling plate, and in which a defective battery cell can also be separated from the battery module in a simple manner.

It is of advantage here if, in the third method step, an adhesive or a compensating element configured in an elastically and/or plastically deformable manner is furthermore arranged between the first surface of the connecting element and the at least one battery cell.

In particular, the at least one battery cell is braced here against the cooling plate.

Furthermore, the invention also relates to a battery comprising a battery module which has just been described or a battery module which has been produced according to a method just described.

Overall, a battery module according to the invention affords the advantage that the connecting system can be configured in an electrically insulating manner and can provide electrical insulation between the cooling plate and the at least one battery cell.

Furthermore, the distance between the at least one battery cell and the cooling plate can be reduced to a minimum size, with it being possible, for example, for the adhesive or the compensating element to compensate for remaining unevennesses.

As a result, it is advantageously possible for the heat transfer between the at least one battery cell and the cooling plate to be able to be improved since, firstly, the distance between the at least one battery cell and the cooling plate can be reduced and, secondly, the heat conductivity can also be increased, for example by means of additives.

In the case of a battery module according to the invention, it is also possible that, after the replacement of a defective battery cell, a new battery cell can be arranged in a simple manner by a new connecting element being arranged in the battery module.

BRIEF DESCRIPTION OF THE DRAWINGS

Embodiments of the invention are illustrated in the drawings and are explained in more detail in the description below.

In the drawings

FIG. 1 schematically shows an illustration of a battery module according to the invention.

DETAILED DESCRIPTION

The battery module 1 has a cooling plate 2 and battery cells 3.

Furthermore, the battery module 1 comprises a connecting system 4.

The connecting system 4 has a first connecting element 41 and a second connecting element 42.

The first connecting element 41 here has a first surface 411 and a further first surface 412.

The first surface 411 and the second surface 412 are arranged here on mutually opposite sides of the first connecting element 41.

The second connecting element 42 here has a second surface 421 and a further second surface 422.

The second surface 421 and the further second surface 422 are arranged here on mutually opposite sides of the second connecting element 42.

The first connecting element 41 can be configured here as a first film 43 and the second connecting element 42 can be configured as a second film 44.

At this juncture, a film 43, 44 is intended to be understood as meaning such a component which is deformable solely by gravitational force during rotation in a gravitational field.

The first surface 411 of the first connecting element 41 is connected to a battery cell 3.

An adhesive 51 is arranged here between the first surface 411 of the first connecting element 41 and the battery cells 3.

Furthermore, a compensating element 52 which is configured in an elastically and/or plastically deformable manner can also be arranged between the first surface 411 of the first connecting element 41 and the battery cells 3.

The adhesive 51 or the compensating element 52 here can also comprise additives 53 which are configured for increasing the heat conductivity.

The second surface 421 of the second connecting element 42 is connected to the cooling plate 2.

The second connecting element 42 here can furthermore comprise an adhesive layer 54 on the second surface 421, wherein the second connecting element 42 is configured in particular to be self-adhesive on the second surface 421.

Of course, it is also possible for an adhesive 55 to be arranged between the second surface 421 of the second connecting element 42 and the cooling plate 2.

Furthermore, the further first surface 412 of the first connecting element 41 is connected to the further second surface 422 of the second connecting element 42.

A further adhesive layer 56 can be arranged here between the further first surface 412 and the further second surface 442. Furthermore, it is also possible for the further first surface 412 to be configured to be self-adhesive.

The connection between the further first surface 412 and the further second surface 422 is configured here with a lower adhesive force than the connection between the first surface 411 and the battery cell 3 and/or than the connection between the second surface 421 and the cooling plate 2.

A battery cell 3 can therefore be separated again from the cooling plate 2 in a simple manner.

What is claimed is:

1. A battery module comprising a cooling plate (2), at least one battery cell (3), and a connecting system (4) which has a first connecting element (41) with a first surface (411) and a further first surface (412), the connecting system (4) having a second connecting element (42) with a second surface (421) and a further second surface (422), wherein the first surface (411) of the first connecting element (41) is adhesively connected to the at least one battery cell (3) via a first adhesive layer (51) between the first connecting element (41) and the at least one battery cell (3), and the second surface (421) of the second connecting element (42) is adhesively connected to the cooling plate (2) via a second adhesive layer (54) between the second connecting element (42) and the cooling plate (2), and the further first surface (412) is adhesively connected to the further second surface (422) via a third adhesive layer (56) between the first connecting element (41) and the second connecting element (42), and wherein an adhesive force provided between the further first surface (412) and the further second surface (422) by the third adhesive layer (52) is less than an adhesive force provided between the first surface (411) and the at least one battery cell (3) by the first adhesive layer (51) and less than an adhesive force provided between the second surface (412) and the cooling plate (2) by the second adhesive layer (54).

2. The battery module according to claim 1, characterized in that the first adhesive layer (51) comprises an adhesive (51) or a compensating element (52) configured in an elastically and/or plastically deformable manner is arranged between the first surface (411) of the first connecting element (41) and the at least one battery cell (3).

3. The battery module according to claim 2, characterized in that the adhesive (51) or the compensating element (52) comprises additives (53) configured for increasing heat conductivity.

4. The battery module according to claim 1, characterized in that the first connecting element (41) is configured as a first film (43) and in that the second connecting element (42) is configured as a second film (44).

5. A battery comprising a battery module according to claim 1.

6. The battery module according to claim 2, characterized in that the first adhesive layer (51) comprises metal particles configured for increasing heat conductivity.

7. The battery module according to claim 6, characterized in that the first adhesive layer (51) is an epoxy adhesive comprising aluminum and/or silver particles.

8. The battery module according to claim 1, characterized in that the first connecting element (41) is configured as a first film (43) and in that the second connecting element (42) is configured as a second film (44), wherein the first film (43) and the second film (44) are each configured as a polyvinyl chloride film or polyester film.

9. The battery module according to claim 8, characterized in that the second connecting element (42) comprises the second adhesive layer (54) on the second surface (421), wherein the second surface (421) is configured to be self-adhesive, and wherein the second film (44) is configured as a polyester film with a layer of acrylate adhesive.

10. The battery module according to claim 1, wherein the third adhesive layer (56) is a rubber adhesive.

11. The battery module according to claim 1, characterized in that the first connecting element (41) comprises the third adhesive layer (56) on the further first surface (412) and the further first surface (412) is configured to be self-adhesive, and/or the second connecting element (42) comprises the third adhesive layer (56) on the further second surface (422) and the further second surface (422) is configured to be self-adhesive.

12. A method for producing a battery module according to claim 1, the method including, in a first method step, the cooling plate (2), the at least one battery cell (3) and the connecting system (4) are provided, the first method step further including adhesively connecting the further first surface (412) and the further second surface (422), in a second method step, the second surface (421) is connected to the cooling plate (2), and, in a third method step, the first surface (411) is adhesively connected to the at least one battery cell (3).

13. The method according to claim 12, characterized in that, in the third method step, the first adhesive layer (51) comprising an adhesive (51) or a compensating element (52) configured in an elastically and/or plastically deformable manner is furthermore arranged between the first surface (411) of the first connecting element (41) and the at least one battery cell (3).

14. The method according to claim 12, characterized in that, in the third method step, the first adhesive layer (51) is configured in an elastically and/or plastically deformable manner and wherein the battery cell (3) is braced against the cooling plate (2).

\* \* \* \* \*